(12) United States Patent
Knecht et al.

(10) Patent No.: US 7,596,294 B2
(45) Date of Patent: Sep. 29, 2009

(54) CABLE ASSEMBLY HAVING SEMI-HARDENED NETWORK ACCESS POINT

(75) Inventors: Dennis M. Knecht, Hickory, NC (US); Christopher Paul Lewallen, Hudson, NC (US); James P. Luther, Hickory, NC (US); Thomas Theuerkorn, Hickory, NC (US); Xin Liu, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/643,358

(22) Filed: Dec. 21, 2006

(65) Prior Publication Data

US 2008/0152293 A1    Jun. 26, 2008

(51) Int. Cl.
*G02B 6/00* (2006.01)
*G02B 6/36* (2006.01)
*G02B 6/44* (2006.01)

(52) U.S. Cl. .................... 385/135; 385/53; 385/76; 385/100

(58) Field of Classification Search ............ 385/54, 385/76, 86, 88, 100, 102, 134–137, 53
See application file for complete search history.

(56) References Cited

U.S. PATENT DOCUMENTS

| | | | |
|---|---|---|---|
| 4,884,863 A | 12/1989 | Throckmorton | 350/96.2 |
| 4,961,623 A | 10/1990 | Midkiff et al. | 350/96.2 |
| 5,004,315 A | 4/1991 | Miyazaki | 350/96.15 |
| 5,042,901 A | 8/1991 | Merriken et al. | 385/135 |
| 5,121,458 A | 6/1992 | Nilsson et al. | 385/100 |
| 5,125,060 A | 6/1992 | Edmundson | 385/100 |
| 5,210,812 A | 5/1993 | Nilsson et al. | 385/100 |
| 5,440,665 A | 8/1995 | Ray et al. | 385/135 |
| 5,528,718 A | 6/1996 | Ray et al. | 385/136 |
| 5,657,413 A | 8/1997 | Ray et al. | 385/139 |
| 5,778,122 A | 7/1998 | Giebel et al. | 385/55 |
| 5,892,870 A | 4/1999 | Fingler et al. | 385/59 |
| RE36,592 E | 2/2000 | Giebel et al. | 385/100 |
| RE37,028 E | 1/2001 | Cooke et al. | 385/112 |
| 6,466,725 B2 | 10/2002 | Battey et al. | 385/135 |

(Continued)

FOREIGN PATENT DOCUMENTS

DE    3537684    4/1987

(Continued)

OTHER PUBLICATIONS

Tyco Electronics Raychem Product Sheet, FITS FOSC—Factory Installed Termination System for Fiber Optic Cable Splices, 1999, 2 pages.

(Continued)

*Primary Examiner*—Frank G Font
*Assistant Examiner*—Jerry M Blevins

(57) ABSTRACT

The present invention provides a cable assembly comprising a flexible network access point that includes a flexible cover over a mid-span access location, providing environmental protection for the mid-span access location and facilitating installation of a distribution cable. Subsequent to installation, the mid-span access location is exposed and accessed by pulling a ripcord, for example, thereby removing a portion of the flexible cover. This exposes one or more connectors, which may be single or multi-fiber connectors, that are configured to receive the receptacles of one or more drop cables and/or tethers. Thus, a semi-hardened, selectively-usable closure is provided.

21 Claims, 13 Drawing Sheets

U.S. PATENT DOCUMENTS

| | | |
|---|---|---|
| 6,619,697 B2 | 9/2003 | Griffoen et al. .......... 285/126.1 |
| 6,621,975 B2 | 9/2003 | Laporte et al. .............. 385/135 |
| 2005/0265672 A1 | 12/2005 | Theuerkorn et al. ......... 385/100 |
| 2005/0265673 A1 | 12/2005 | Mumm et al. ................ 385/100 |
| 2005/0276552 A1* | 12/2005 | Cooke et al. ................ 385/100 |
| 2006/0093278 A1 | 5/2006 | Elkins, II, et al. ............. 385/76 |
| 2006/0291792 A1* | 12/2006 | Vo et al. ..................... 385/135 |
| 2008/0131055 A1* | 6/2008 | Parkman et al. ............... 385/58 |

FOREIGN PATENT DOCUMENTS

| | | |
|---|---|---|
| EP | 0512811 A | 5/1992 |
| JP | 58-105114 | 6/1983 |
| JP | 60-169813 | 9/1985 |
| JP | 60-169815 | 9/1985 |
| JP | 61-220536 | 9/1986 |
| JP | 62-054204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001116968 | 4/2001 |
| JP | 2003/177254 | 6/2003 |
| WO | WO 2006/044080 A1 | 4/2006 |

OTHER PUBLICATIONS

Patent Cooperation Treaty, International Search Report for International Application No. PCT/US2007/025139, Jun. 2, 2008, 2 pages.

* cited by examiner

CABLE ASSEMBLY HAVING SEMI-HARDENED NETWORK ACCESS POINT

BACKGROUND OF THE INVENTION

1. Field of the Invention

The present invention relates generally to cable assemblies having semi-hardened network access points that are deployed in fiber optic communications networks. More specifically, the present invention relates to cable assemblies having semi-hardened network access points that are used for routing, securing, and protecting pre-terminated and/or pre-connectorized optical fibers, including fiber optic drop cables and/or tethers, that are branched or withdrawn from a fiber optic distribution cable at mid-span access locations. These network access points are also referred to as "Flexible Network Access Points" (FNAPs or FlexNAP).

2. Technical Background of the Invention

Optical fibers are increasing being used in a variety of broadband applications, including voice, video, and data transmission applications. As a result of this ever-increasing demand, fiber optic communications networks typically include a relatively large number of mid-span access locations at which one or more optical fibers, including drop cables and/or tethers, are branched or withdrawn from a distribution cable. These mid-span access locations provide multiple dedicated optical fiber drops that are used to connect a plurality of subscribers to the networks. Thus, the mid-span access locations are used to extend "all optical" networks to commercial and residential subscribers. In this regard, networks are being developed that deliver "fiber-to-the-curb" (FTTC), "fiber-to-the-business" (FTTB), "fiber-to-the-home" (FTTH), and "fiber-to-the-premises" (FTTP), collectively referred to as "FTTx." Based upon the increase in the number of mid-span access locations and the unique physical attributes of optical fibers themselves, structure is needed for routing, securing, and protecting the optical fibers at the mid-span access locations during and subsequent to the installation of a distribution cable. Preferably, the structure provides selective access for pre-terminated and/or pre-connectorized optical fibers, including drop cables and/or tethers, while simultaneously protecting the mid-span access locations from exposure to adverse environmental conditions. The structure should not, however, prevent the distribution cable from being deployed through relatively small diameter conduits (e.g., 1.25-inch conduits), or over conventional sheave wheels, rollers, and/or pulleys.

In one exemplary fiber optic communications network, one or more drop cables are interconnected with a distribution cable at a mid-span access location within an aerial splice closure that is suspended from an aerial strand or the distribution cable itself. Substantial expertise and experience are required to configure the optical connections within the closure in the field. In particular, it is often difficult to enter the closure and identify an optical fiber of the distribution cable that is to be interconnected with an optical fiber of the drop cable. Once identified, the optical fiber of the drop cable is typically joined directly to the optical fiber of the distribution cable using a conventional splicing technique, such as fusion splicing. In other instances, the optical fiber of the drop cable and the optical fiber of the distribution cable are first spliced to a relatively short length of optical fiber having a pre-mounted connector on the other end, referred to in the art as a "pigtail." These pigtails are routed to opposite sides of an adapter sleeve that is disposed within the closure to interconnect the drop cable with the distribution cable. In either case, the process of entering and configuring the closure is not only time consuming, but must be accomplished by a highly-skilled field technician at significant cost and under working conditions that are often less than ideal. Reconfiguring optical fiber connections in an aerial splice closure is especially difficult, particularly in instances in which at least some of the optical fibers of the distribution cable extend uninterrupted through the closure, as the closure cannot be readily removed from the distribution cable.

Other low-volume FlexNAP solutions have included the use of a "bare" MT ferrules disposed within a low-profile molded protective envelope and the use of a "hardened" connector in either an "integrated" configuration or a tethered plug arrangement. These solutions, however, have proven to be too delicate and to have too large of a form factor. In order to reduce costs by permitting less-skilled and less-experienced field technicians to mid-span optical fiber configurations and reconfigurations, communications service providers are increasingly pre-engineering networks and demanding factory-prepared interconnection solutions, referred to as "plug-and-play" type systems.

In response to these demands, fiber optic hardware and equipment manufacturers have developed several approaches to overcome the disadvantages of accessing and splicing optical fibers in the field. In one such approach, drop cables are spliced to a distribution cable in the factory during manufacturing. While advantageous for manufacturing high-quality mid-span access locations in an environmentally-controlled manner, disadvantages include the relatively large size (i.e. diameter) and inflexibility of the distribution cable assembly at the mid-span access locations, as well as the incremental cost associated with dormant drop cables. More importantly, pre-engineered drop cables may not always be able to mitigate misplacement of the mid-span access locations due to inaccurate measurements or installation errors because the drop cables are manufactured with predetermined lengths. As such, these approaches do not completely address the communications service providers' need to reduce installation and deployment costs.

Thus, communications service providers continue to demand low-profile plug-and-play type systems that may be installed and deployed using existing equipment and methods, and that require a minimum amount of field labor for performing interconnections. It would be desirable to provide a robust closure for routing, securing, and protecting pre-terminated and/or pre-connectorized optical fibers, including drop cables and/or tethers, that are branched or withdrawn from a distribution cable at mid-span access locations. It would also be desirable to provide a robust closure for FTTx networks that may be readily reconfigured after installation, such that drop cables may quickly and easily be interconnected at the mid-span access locations. It would further be desirable to factory assemble the closures on the distribution cable at the mid-span access locations with the lowest possible profiles (i.e. outer diameters), while maintaining access to the optical fibers branched or withdrawn from the distribution cable.

BRIEF SUMMARY OF THE INVENTION

The present invention provides a cable assembly that includes a flexible cover over a mid-span access location, providing environmental protection for the mid-span access location and facilitating installation of a distribution cable. Subsequent to installation, the mid-span access location is exposed and accessed by pulling a ripcord, for example, thereby removing a portion of the flexible cover. This exposes one or more connectors, which may be single or multi-fiber connectors, that are configured to receive the receptacles of one or more drop cables and/or tethers. Thus, a semi-hardened, selectively-usable closure is provided.

In one embodiment, a cable assembly having a semi-hardened network access point includes a distribution cable; a closure having at least one flexible portion, wherein the closure having at least one flexible portion is disposed about the distribution cable prior to the installation of the cable assembly in the field; and a connector maintained at least partially within the closure having at least one flexible portion prior to the installation of the cable assembly in the field, wherein the connector is optically coupled to the distribution cable. In one embodiment, the closure is entirely flexible. The connector is maintained entirely within the entirely flexible closure prior to the installation of the cable assembly in the field. A portion of the connector is selectively exposed to the outside environment subsequent to the installation of the cable assembly in the field. The cable assembly also includes a rigid receptacle that is optically coupled to the exposed portion of the connector subsequent to the installation of the cable assembly in the field. In another embodiment, the closure has at least one flexible interior portion and one rigid exterior portion. The cable assembly also includes a rigid receptacle that is optically coupled to an exposed portion of the connector subsequent to the installation of the cable assembly in the field. In either embodiment, the cable assembly further includes an anti-rotation mechanism associated with the distribution cable and the closure, the anti-rotation mechanism preventing relative rotation between the distribution cable and the closure. Preferably, the cable assembly is sized such that it fits through a 1.25-inch conduit. Optionally, the cable assembly includes a rigid connector assembly holder and a rigid connector assembly cover disposed within the closure having at least one flexible portion, wherein the connector is maintained entirely within the connector assembly holder and the connector assembly cover prior to the installation of the cable assembly in the field. Finally, the cable assembly includes one or more ripcords coupled to at least the connector assembly cover, the one or more ripcords selectively pulled to remove the connector assembly cover from the connector assembly holder, thereby selectively exposing a portion of the connector to the outside environment subsequent to the installation of the cable assembly in the field.

In another embodiment, a method for manufacturing and using a cable assembly having a semi-hardened network access point includes providing a distribution cable; providing a closure having at least one flexible portion, wherein the closure having at least one flexible portion is disposed about the distribution cable prior to the installation of the cable assembly in the field; and providing a connector maintained at least partially within the closure having at least one flexible portion prior to the installation of the cable assembly in the field, wherein the connector is optically coupled to the distribution cable. In one embodiment, the closure is entirely flexible. The connector is maintained entirely within the entirely flexible closure prior to the installation of the cable assembly in the field. A portion of the connector is selectively exposed to the outside environment subsequent to the installation of the cable assembly in the field. The method also includes providing a rigid receptacle that is optically coupled to the exposed portion of the connector subsequent to the installation of the cable assembly in the field. In another embodiment, the closure has at least one flexible interior portion and one rigid exterior portion. The method also includes providing a rigid receptacle that is optically coupled to an exposed portion of the connector subsequent to the installation of the cable assembly in the field. In either embodiment, the method further includes providing an anti-rotation mechanism associated with the distribution cable and the closure, the anti-rotation mechanism preventing relative rotation between the distribution cable and the closure. Preferably, the cable assembly is sized such that it fits through a 1.25-inch conduit. Optionally, the method includes providing a rigid connector assembly holder and a rigid connector assembly cover disposed within the closure having at least one flexible portion, wherein the connector is maintained entirely within the connector assembly holder and the connector assembly cover prior to the installation of the cable assembly in the field. Finally, the method includes providing one or more ripcords coupled to at least the connector assembly cover, the one or more ripcords selectively pulled to remove the connector assembly cover from the connector assembly holder, thereby selectively exposing a portion of the connector to the outside environment subsequent to the installation of the cable assembly in the field.

Additional features and advantages of the present invention are set forth in the detailed description below. In view of this detailed description, other features and advantages will be readily apparent to those of ordinary skill in the art. It is to be understood that the general description above and the detailed description relate to exemplary embodiments of the present invention, and are intended to provide an overview and framework for understanding the nature and character of the present invention as it is claimed, explaining the principles of operation thereof.

BRIEF DESCRIPTION OF THE DRAWINGS

The present invention is illustrated and described herein with reference to the various drawings in which like reference numbers are used to refer to like parts, as appropriate, and in which:

FIG. 5 is a perspective view illustrating how one or more ripcords pass through the flexible overmolded closure so that they may be pulled by a field technician or the like;

DETAILED DESCRIPTION OF THE INVENTION

Reference will now be made to preferred embodiments of the present invention, examples of which are illustrated in the accompanying drawings. The present invention provides a cable assembly that includes a flexible cover over at least a portion of a mid-span access location, providing environmental protection for the mid-span access location and facilitating installation of a distribution cable. Subsequent to installation, the mid-span access location is exposed and accessed by pulling a ripcord, for example, thereby removing a portion of the flexible cover. This exposes one or more connectors, which may be single or multi-fiber connectors, that are configured to receive the receptacles of one or more drop cables and/or tethers. Thus, a semi-hardened, selectively-usable closure is provided.

Figure 1:
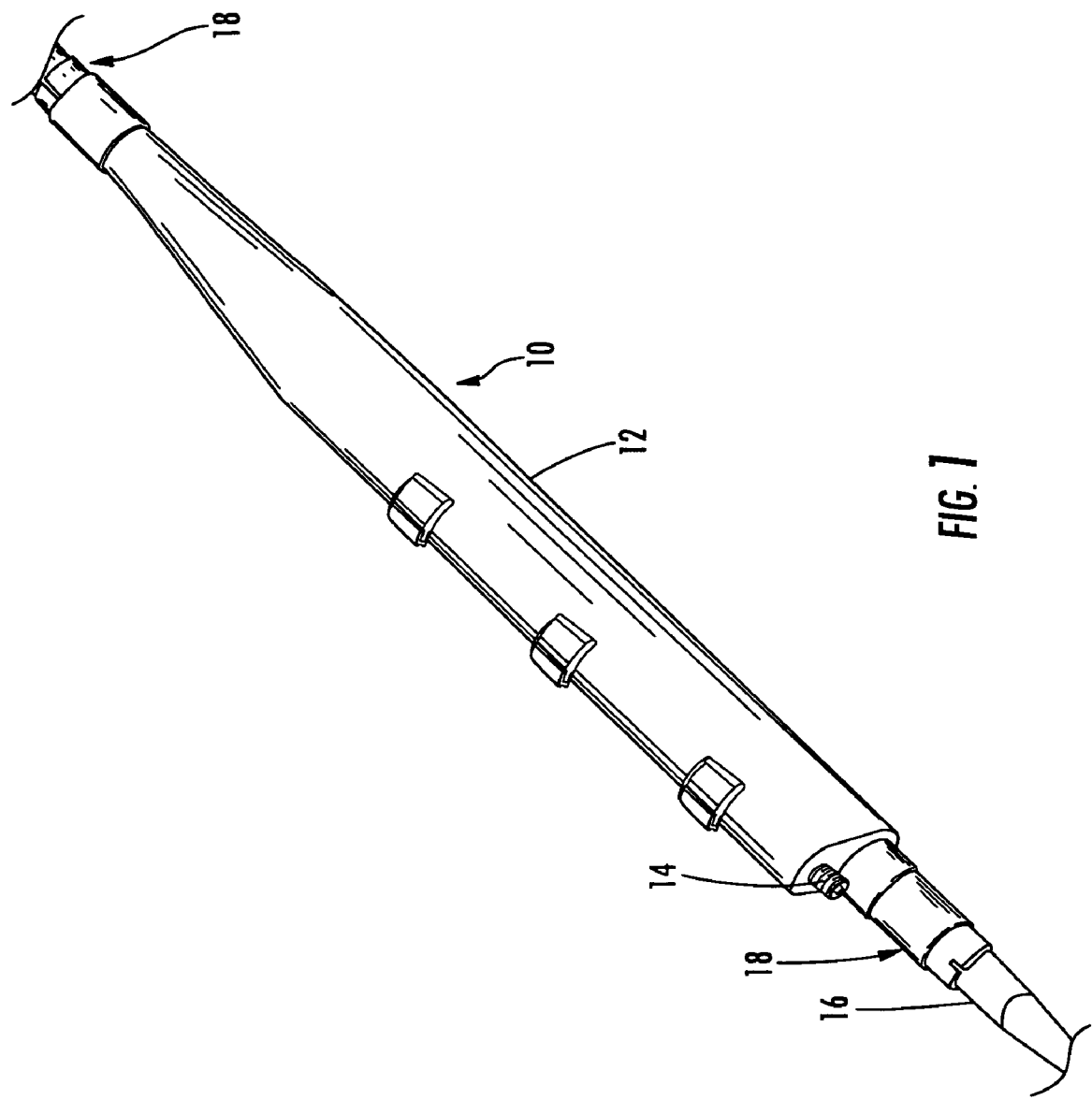
FIG. 1 is a perspective view of one embodiment of a cable assembly having a semi-hardened network access point.

Referring to FIG. 1, in one embodiment, the cable assembly 10 of the present invention includes a flexible, semi-rigid, or rigid closure 12 that holds one or more fiber optic connectors 14 that are each configured to receive the receptacle of a drop cable and/or tether (not illustrated). The one or more connectors 14 may each be a single or multi-fiber connector, thus the closure 12 may contain one or multiple stacks of fiber optic ribbons. Advantageously, the one or more connectors 14 are selectively exposed to the environment through a variety of mechanisms, described in greater detail below. Closures 12 such as that illustrated are preferably disposed at multiple spaced-apart mid-span access locations along a distribution cable 16. Thus, multiple drop cables and/or tethers may be quickly and easily interconnected with the distribution cable 16 in order to connect a subscriber to a fiber optic communications network, for example, without the need for splicing or other labor/time-intensive interconnection techniques. The closure 12 and one or more connectors 14 are prevented from rotating about the distribution cable 16 via one or more anti-rotation collars 18 disposed at the ends of the closure 12, also described in greater detail below. In general, the closure 12 is used to route, secure, and protect pre-terminated and/or pre-connectorized optical fibers during the installation of the distribution cable 16 and thereafter until the optical fibers are interconnected with drop cables. The entire cable assembly 10 is flexible and low-profile, such that it may be wound onto a cable reel for transport and deployment in aerial, direct buried, and buried installations, such as within a conduit (e.g., a 1.25-inch conduit) or over conventional sheave wheels, rollers, and/or pulleys. The closure 12 is assembled to the distribution cable 16 in the factory, providing the desired plug-and-play cable assembly 10. A variety of closure types are contemplated by the present invention, including a flexible overmolded closure, a gel-filled snap-on closure, and a clamp-on closure.

Figure 2:
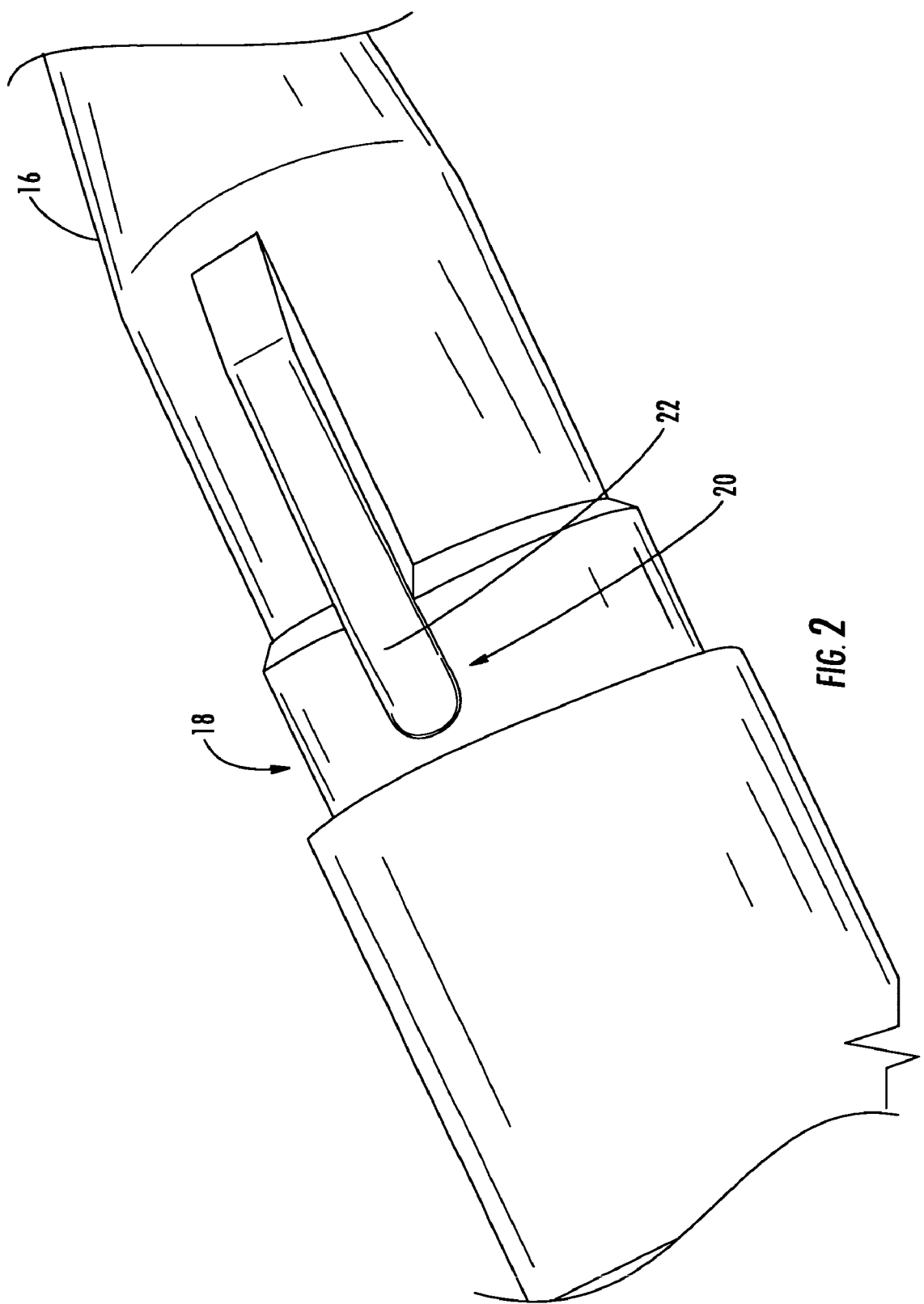
FIG. 2 is a perspective view of one embodiment of the anti-rotation collar used with the cable assembly of FIG. 1.

Referring to FIG. 2, the one or more anti-rotation collars 18 that are used to prevent the closure 12 (FIG. 1) and one or more connectors 14 (FIG. 1) from rotating about the distribution cable 16 each include a notch or recess 20 that is manufactured into an end portion of the closure 12. This notch or recess 20 is configured to engage a raised ridge 22 that is manufacturing into the exterior sheathing of the distribution cable 16. It will be readily apparent to those of ordinary skill in the art that other mechanisms may be used to prevent the closure 12 and one or more connectors 14 from rotating about the distribution cable 16, provided such mechanisms have a small enough form factor and are low profile.

Figure 3:
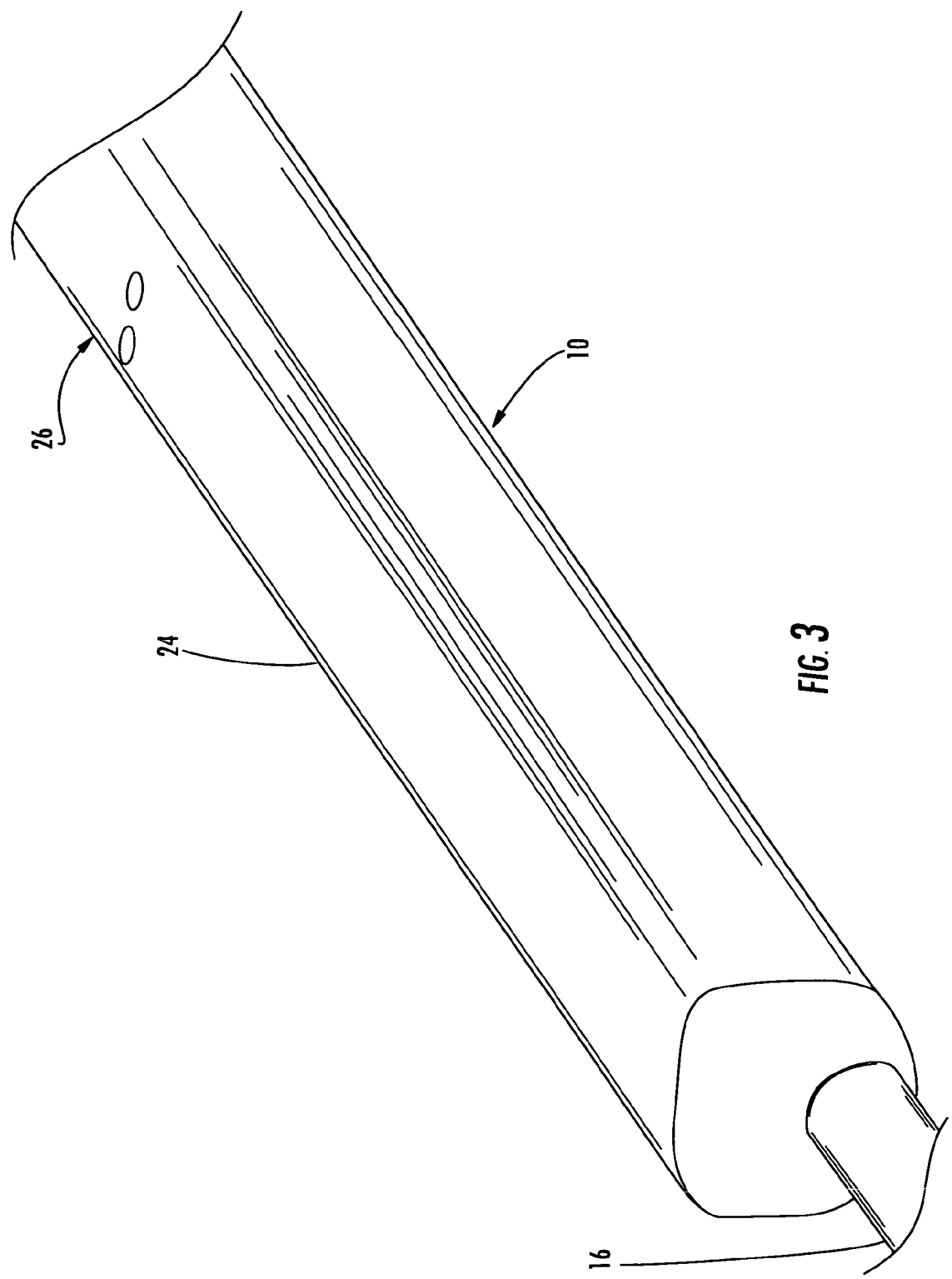
FIG. 3 is a perspective view of another embodiment of a cable assembly having a semi-hardened network access point, the cable assembly utilizing a flexible overmolded closure.

Referring to FIG. 3, in another embodiment, the cable assembly 10 of the present invention includes a flexible overmolded closure 24 that is disposed about the distribution cable 16 at one or more mid-span access locations, thereby routing, securing, and protecting the pre-terminated and/or pre-connectorized optical fibers disposed within. A portion of the flexible overmolded closure 24 is selectively removed subsequent to the installation of the drop cable 16 in order to expose the one or more connectors 14 (FIG. 1) so that one or more drop cables and/or tethers may be interconnected with them. In the embodiment illustrated, one or more ripcords 26, such as one or more wire ripcords, are used to selectively remove the portion of the flexible overmolded closure 24, described in greater detail below.

Figure 4:
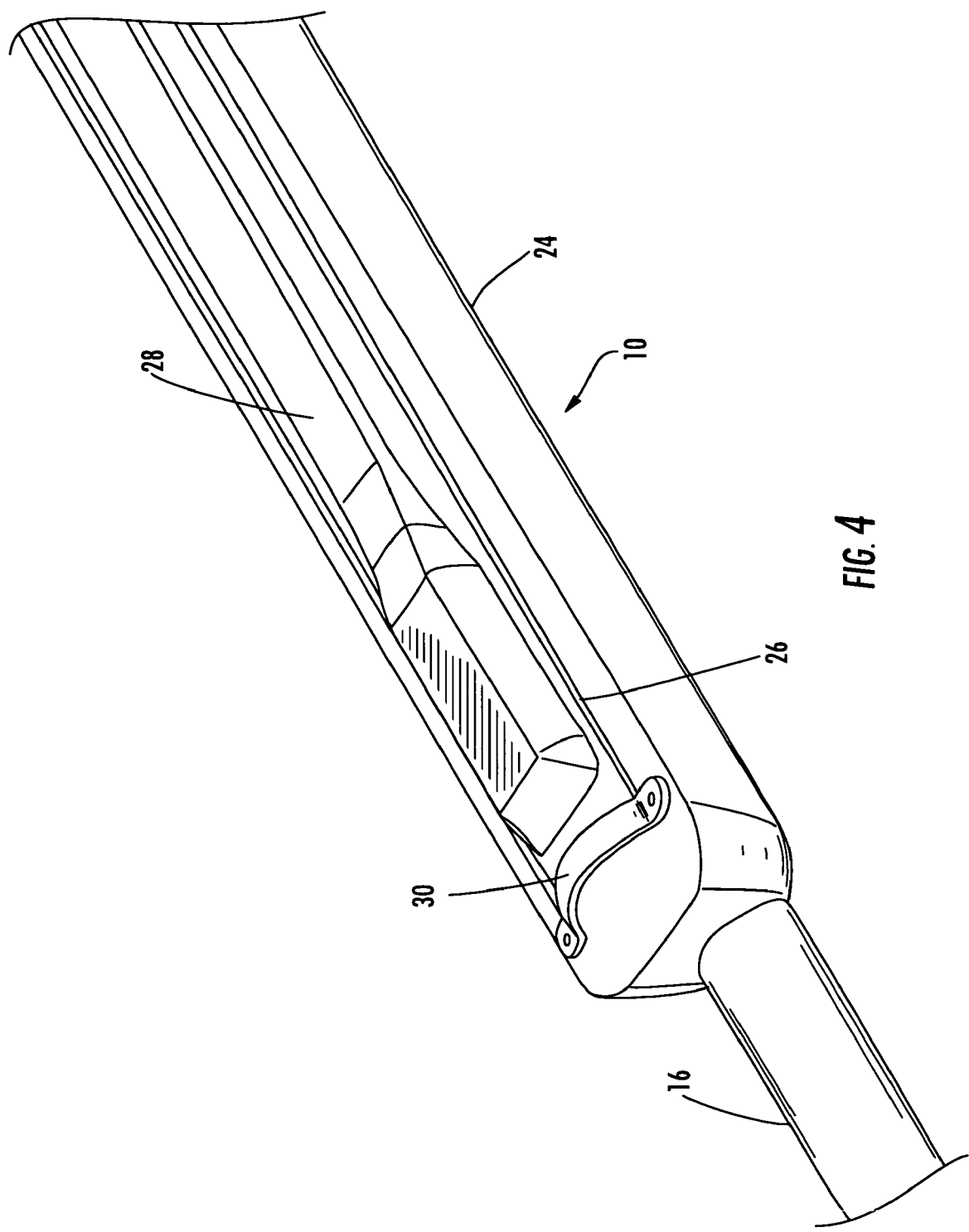
FIG. 4 is a perspective view of the cable assembly of FIG. 3 with a portion of the flexible overmolded closure removed to illustrate the internal ripcord configuration.
Figure 5:
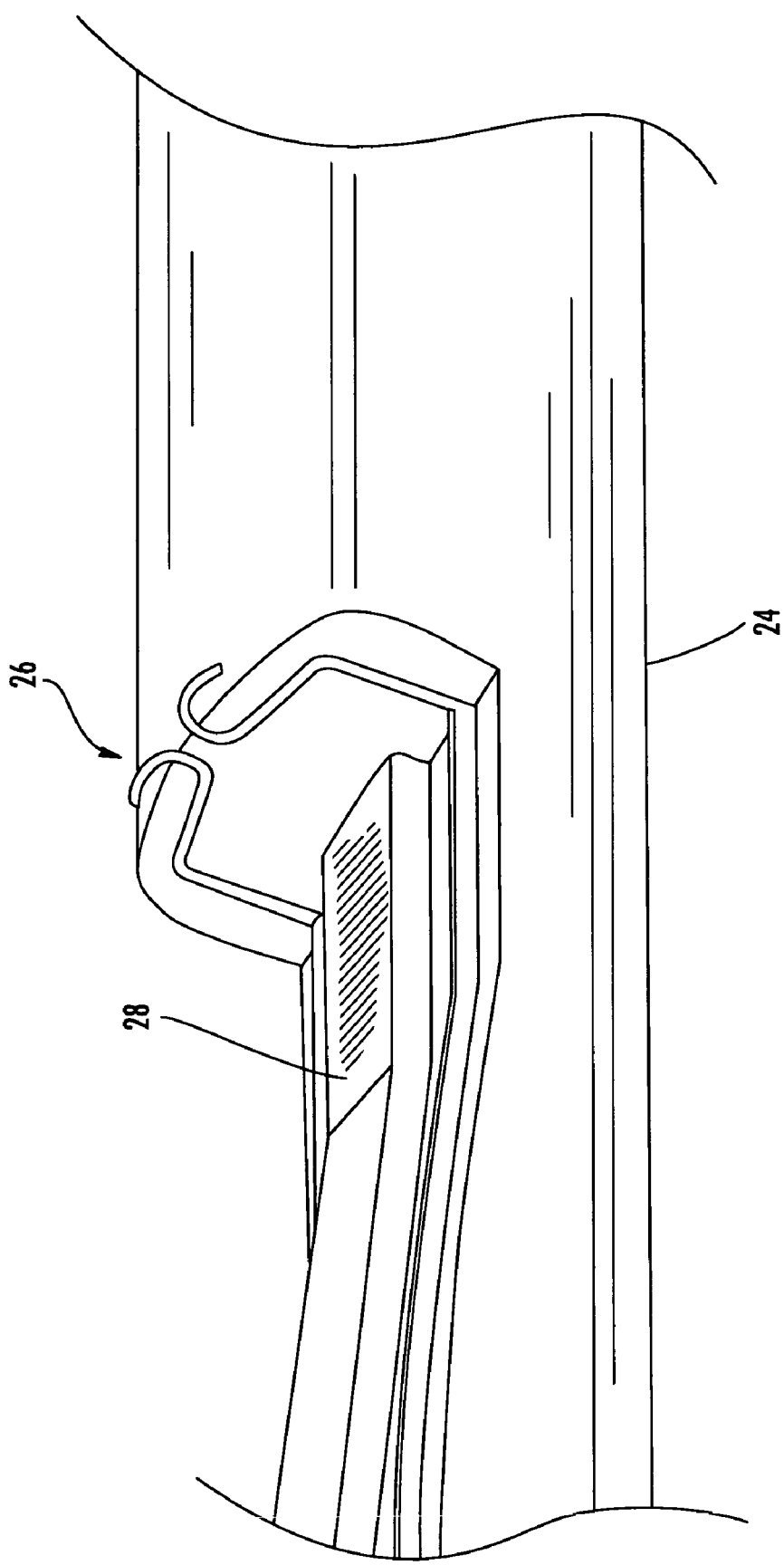

Referring to FIG. 4, inside the flexible overmolded closure 24, the one or more ripcords 26 are attached to a connector assembly cover 28 and secured to a ripcord anchoring bracket 30. Preferably, this connector assembly cover 28 has equal or greater rigidity than the surrounding flexible overmolded closure material, such that when the one or more ripcords 26 are pulled, the connector assembly cover 28 is displaced upwards, thereby displacing the flexible overmolded closure material disposed thereon and exposing the one or more connectors 14 (FIG. 1). In order to assist in this process, the flexible overmolded closure 24 may be perforated in a pattern substantially corresponding to the shape of the connector assembly cover 28. Preferably, the connector assembly cover 28 and the flexible overmolded closure material disposed thereon are also removable once displaced. FIG. 5 illustrates precisely how the one or more ripcords 26 pass through the flexible overmolded closure 24 so that they may be pulled by a field technician or the like. Again, it will be readily apparent to those of ordinary skill in the art that other means may be used to remove a portion of the flexible overmolded closure 24 and expose the one or more connectors 14.

Figure 6:
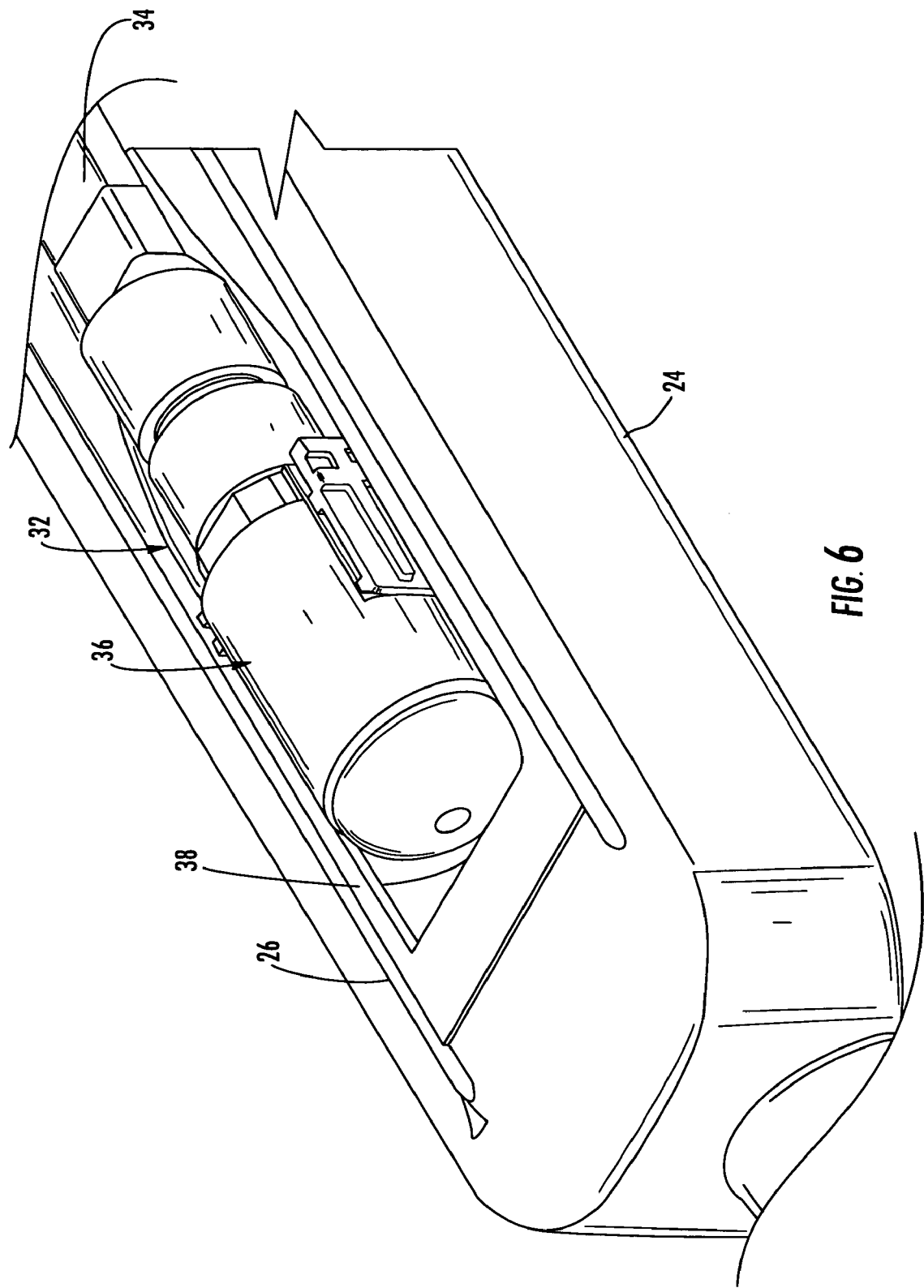
FIG. 6 is another perspective view of the cable assembly of FIG. 3 with a portion of the flexible overmolded closure and the connector assembly cover removed to illustrate the internal connector assembly configuration.

Referring to FIG. 6, inside the flexible overmolded closure 24, the one or more ripcords 26 are also attached to a connector assembly holder 38. Preferably, this connector assembly holder 38 has equal or greater rigidity than the surrounding flexible overmolded closure material, such that when the one or more ripcords 26 are pulled, the connector assembly cover 28 (FIGS. 4 and 5) is displaced upwards, thereby displacing the flexible overmolded closure material disposed thereon and exposing the connector assembly 32 disposed within the connector assembly holder 38. Advantageously, the connector assembly holder 38 and the connector assembly cover 28 together provide a sealed compartment within which the connector assembly 32 is encased during manufacture in order to prevent the connector assembly 32 from being "fouled" by the flexible overmolded closure material. The connector assembly 32 is optically interconnected with an optical fiber, ribbon of optical fibers, fanout ribbon tube, etc. 34. Optionally, the connector assembly 32 includes a removable dust cap 36 that protects the end portion of the connector assembly 32.

Figure 7:
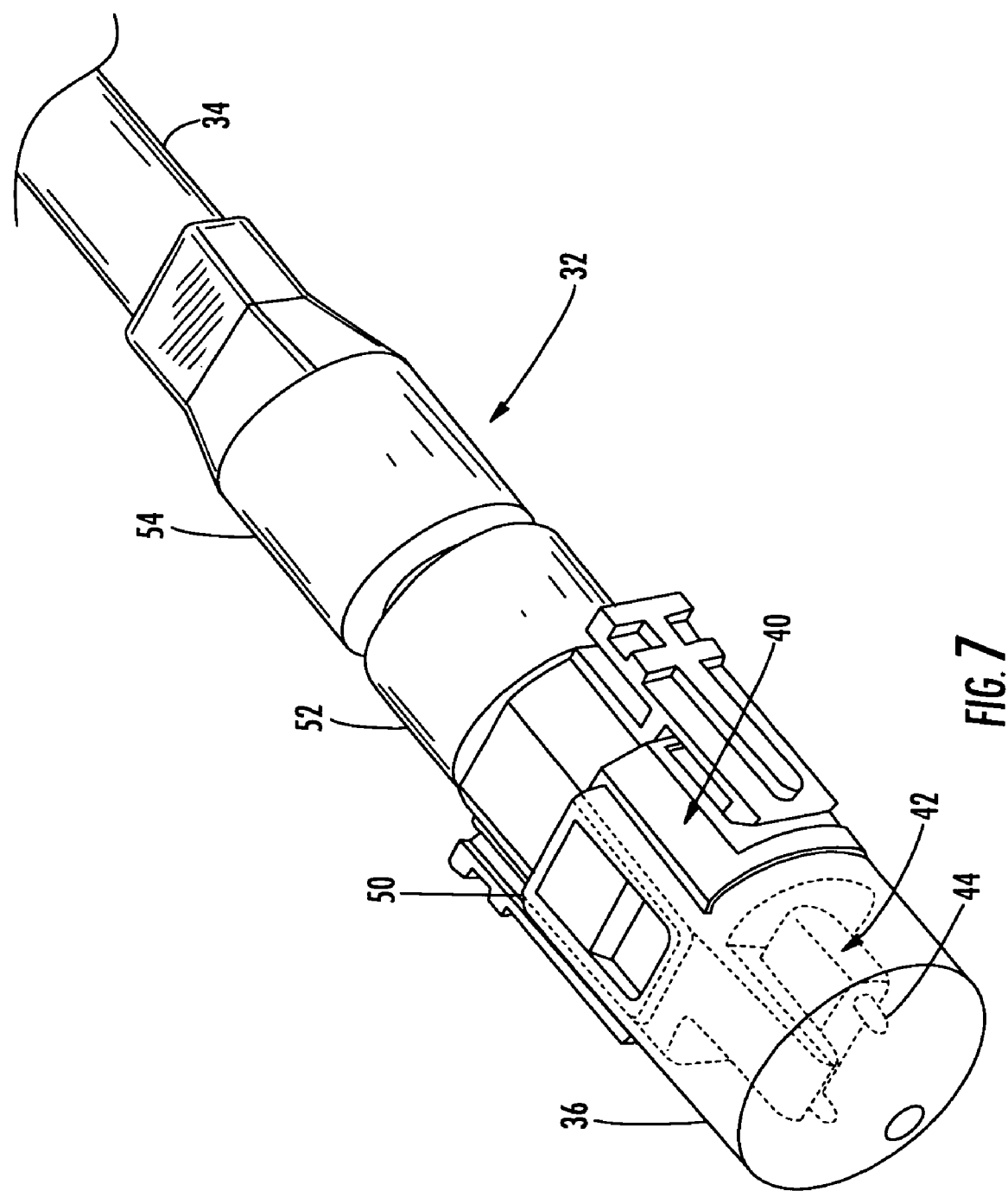
FIG. 7 is a perspective view of the internal connector assembly configuration of FIG. 6.
Figure 8:
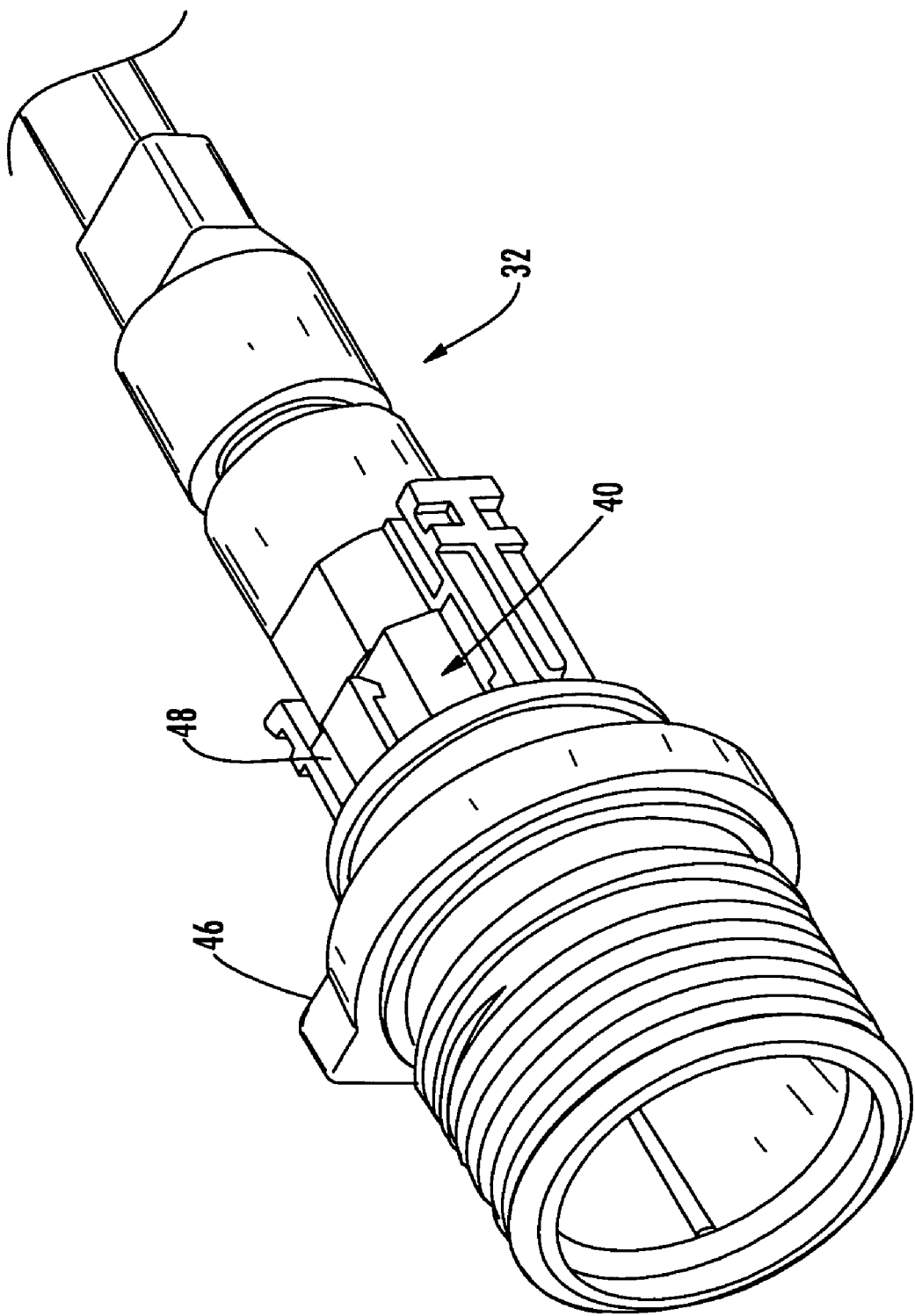
FIG. 8 is another perspective view of the internal connector assembly configuration of FIG. 6, the connector being mated with a receptacle.

Referring to FIG. 7, the connector assembly 32 includes a housing 40 that is configured to retain a ferrule 42 and, optionally, one or more alignment pins 44 that are configured to engage a corresponding ferrule and, optionally, one or more alignment bores of a receptacle 46 (FIG. 8). Preferably, this receptacle 46 is secured to the housing 40 via one or more retainer clips 48 (FIG. 8) or the like. Again, when the receptacle 46 is not secured to the housing 40, a dust cap 36 is used to protect the ferrule 42 and one or more alignment pins 44. Like the receptacle 46, the dust cap 36 is secured to the housing 40 via one or more retainer clips 50 or the like. On the backside, the connector assembly 32 includes a crimp body 52 and a shrink-wrap boot 54 that secure the housing 40 to the optical fiber, ribbon of optical fibers, fanout ribbon tube, etc. 34. Collectively, the components of the connector assembly 32 represent a "semi-hardened" assembly. It will be readily apparent to those of ordinary skill in the art that a variety of conventional and novel connector assemblies may be used with the flexible overmolded closure, gel-filled snap-on closure, or clamp-on closure of the present invention.

Figure 9:
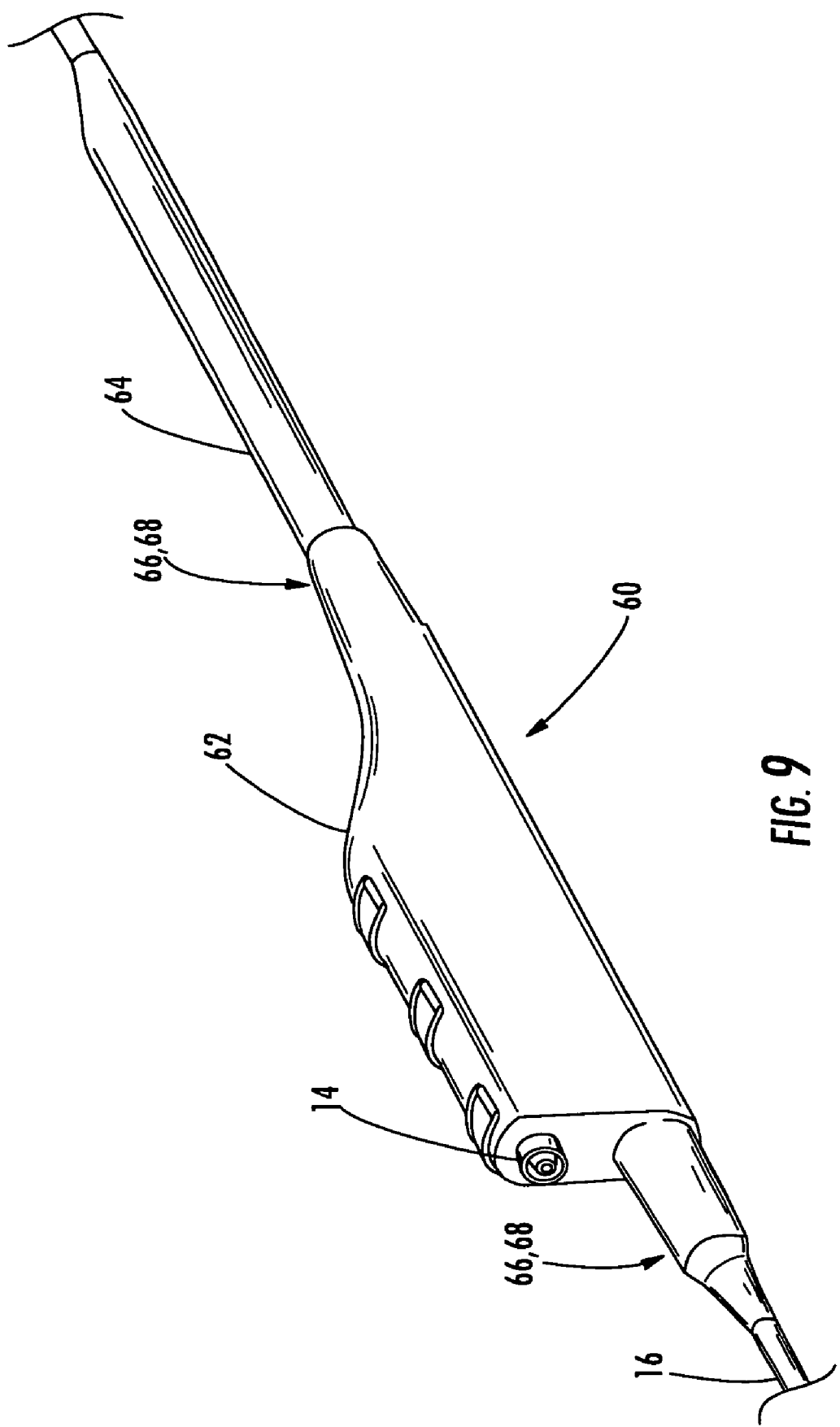
FIG. 9 is a perspective view of another embodiment of a cable assembly having a semi-hardened network access point.

Referring to FIG. 9, in another embodiment, the cable assembly 60 of the present invention includes a semi-rigid or rigid closure 62 that is "snapped" over a flexible overmolded cover 64 that is disposed about the distribution cable 16 and holds one or more fiber optic connectors 14 that are each configured to receive the receptacle of a drop cable and/or tether (not illustrated). The one or more connectors 14 may each be a single or multi-fiber connector, thus the closure 62 may contain one or multiple stacks of fiber optic ribbons. Advantageously, the one or more connectors 14 are selectively exposed to the environment. Closures 62 such as that illustrated are preferably disposed at multiple spaced-apart mid-span access locations along the distribution cable 16. Thus, multiple drop cables and/or tethers may be quickly and easily interconnected with the distribution cable 16 in order to connect a subscriber to a fiber optic communications network, for example, without the need for splicing or other labor/time-intensive interconnection techniques. The closure 62 and one or more connectors 14 are prevented from rotating about the distribution cable 16 via one or more anti-rotation recesses 66 disposed at the ends of the closure 62 and one or more corresponding anti-rotation ridges 68, manufactured into the flexible overmolded cover 64. In general, the closure 62 is used to route, secure, and protect pre-terminated and/or pre-connectorized optical fibers during the installation of the distribution cable 16 and thereafter until the optical fibers are interconnected with drop cables. The entire cable assembly 60 is flexible and low-profile, such that it may be wound onto a cable reel for transport and deployment in aerial, direct buried, and buried installations, such as within a conduit (e.g., a 1.25-inch conduit) or over conventional sheave wheels, rollers, and/or pulleys. The closure 62 is assembled to the distribution cable 16 in the factory, providing the desired plug-and-play cable assembly 60. Again, a variety of closure types are contemplated by the present invention, including a flexible overmolded closure, a gel-filled snap-on closure, and a clamp-on closure.

Figure 10:
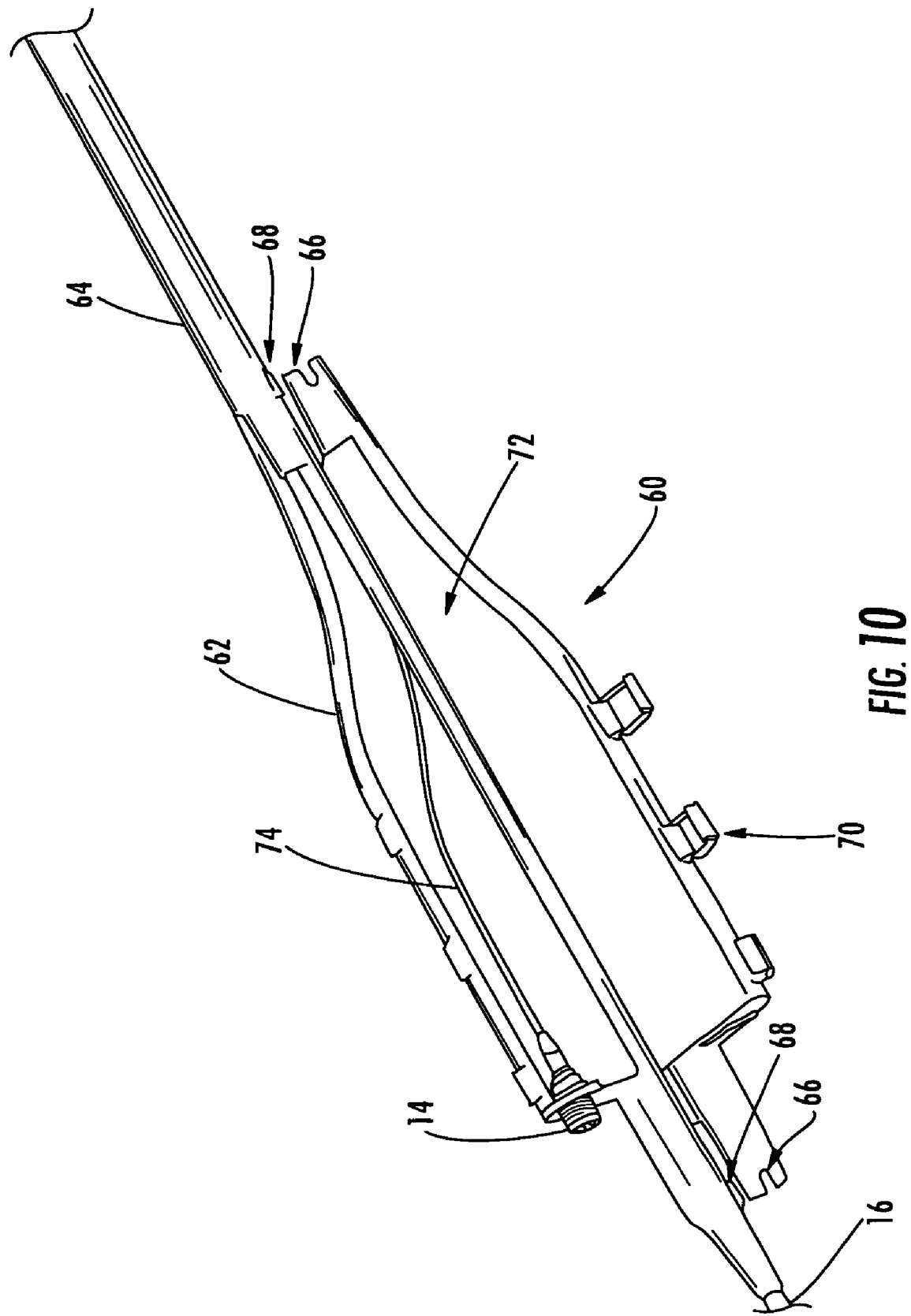
FIG. 10 is a perspective view of the cable assembly of FIG. 9, illustrated in an "unsnapped" or open configuration.

Referring to FIG. 10, the closure 62 includes a plurality of snapping or locking mechanisms 70 selectively securing the closure 62 about the flexible overmolded cover 64. Preferably, the interior portion of the closure 62 is filled with a soft gel 72, such as a urethane gel or the like, that serves to cushion and protect the optical fiber(s) 74 that are routed from the distribution cable 16 to the connector 14.

Figure 11:
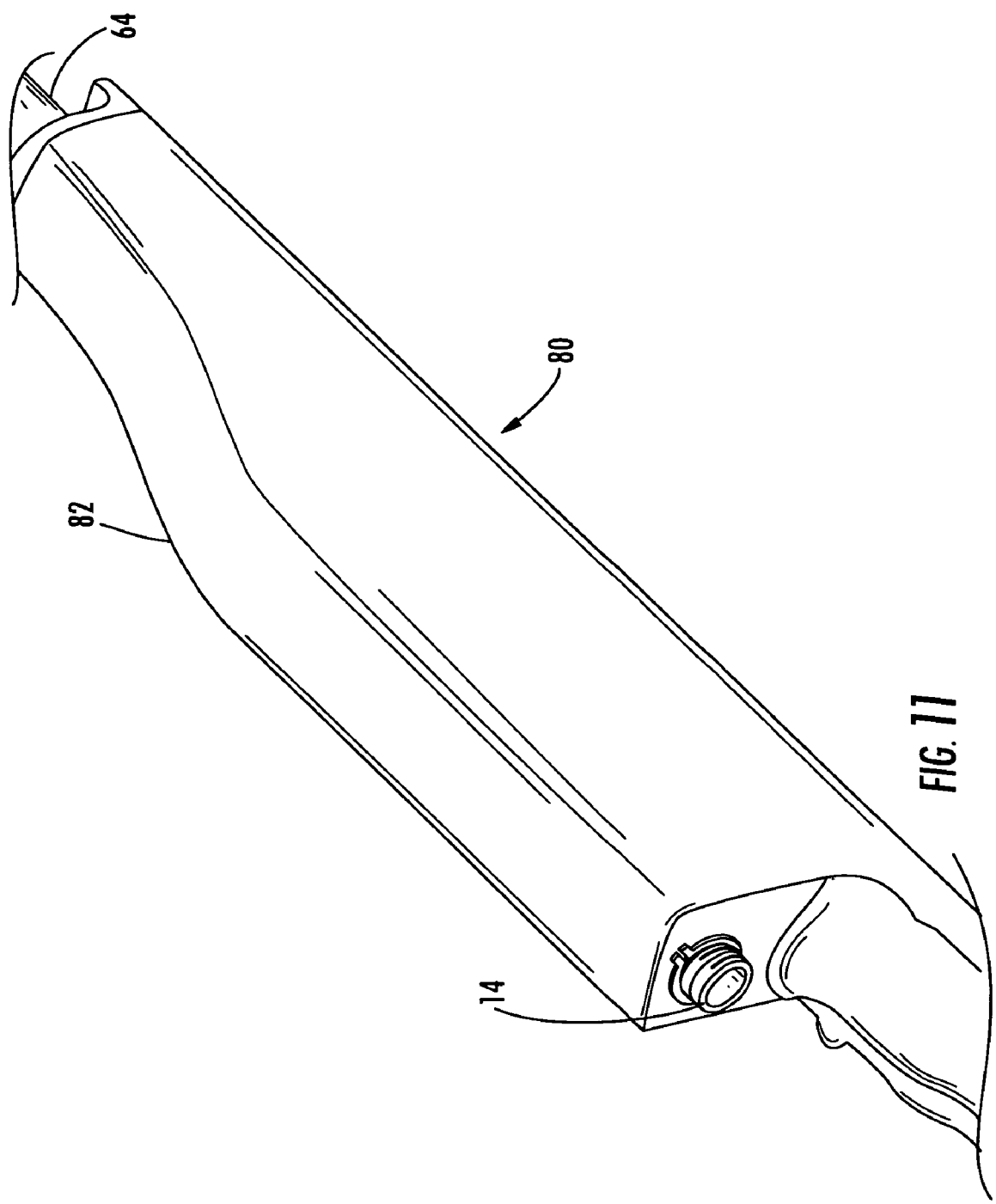
FIG. 11 is a perspective view of a further embodiment of a cable assembly having a semi-hardened network access point.

Referring to FIG. 11, in a further embodiment, the cable assembly 80 of the present invention includes a semi-rigid or rigid closure 82 that is "clamped" over the flexible overmolded cover 64 that is disposed about the distribution cable (not illustrated) and holds one or more fiber optic connectors 14 that are each configured to receive the receptacle of a drop cable and/or tether (not illustrated). The one or more connectors 14 may each be a single or multi-fiber connector, thus the closure 82 may contain one or multiple stacks of fiber optic ribbons. Advantageously, the one or more connectors 14 are selectively exposed to the environment. Closures 82 such as that illustrated are preferably disposed at multiple spaced-apart mid-span access locations along the distribution cable. Thus, multiple drop cables and/or tethers may be quickly and easily interconnected with the distribution cable in order to connect a subscriber to a fiber optic communications network, for example, without the need for splicing or other labor/time-intensive interconnection techniques. The closure 82 and one or more connectors 14 are prevented from rotating about the distribution cable via one or more seals (not illustrated) disposed within the closure 82 or manufactured into the exterior surface of the flexible overmolded cover 64. In general, the closure 62 is used to route, secure, and protect pre-terminated and/or pre-connectorized optical fibers during the installation of the distribution cable and thereafter until the optical fibers are interconnected with drop cables. The entire cable assembly 80 is flexible and low-profile, such that it may be wound onto a cable reel for transport and deployment in aerial, direct buried, and buried installations, such as within a conduit (e.g., a 1.25-inch conduit) or over conventional sheave wheels, rollers, and/or pulleys. The closure 82 is assembled to the distribution cable in the factory, providing the desired plug-and-play cable assembly 80. Again, a variety of closure types are contemplated by the present invention, including a flexible overmolded closure, a gel-filled snap-on closure, and a clamp-on closure.

Figure 12:
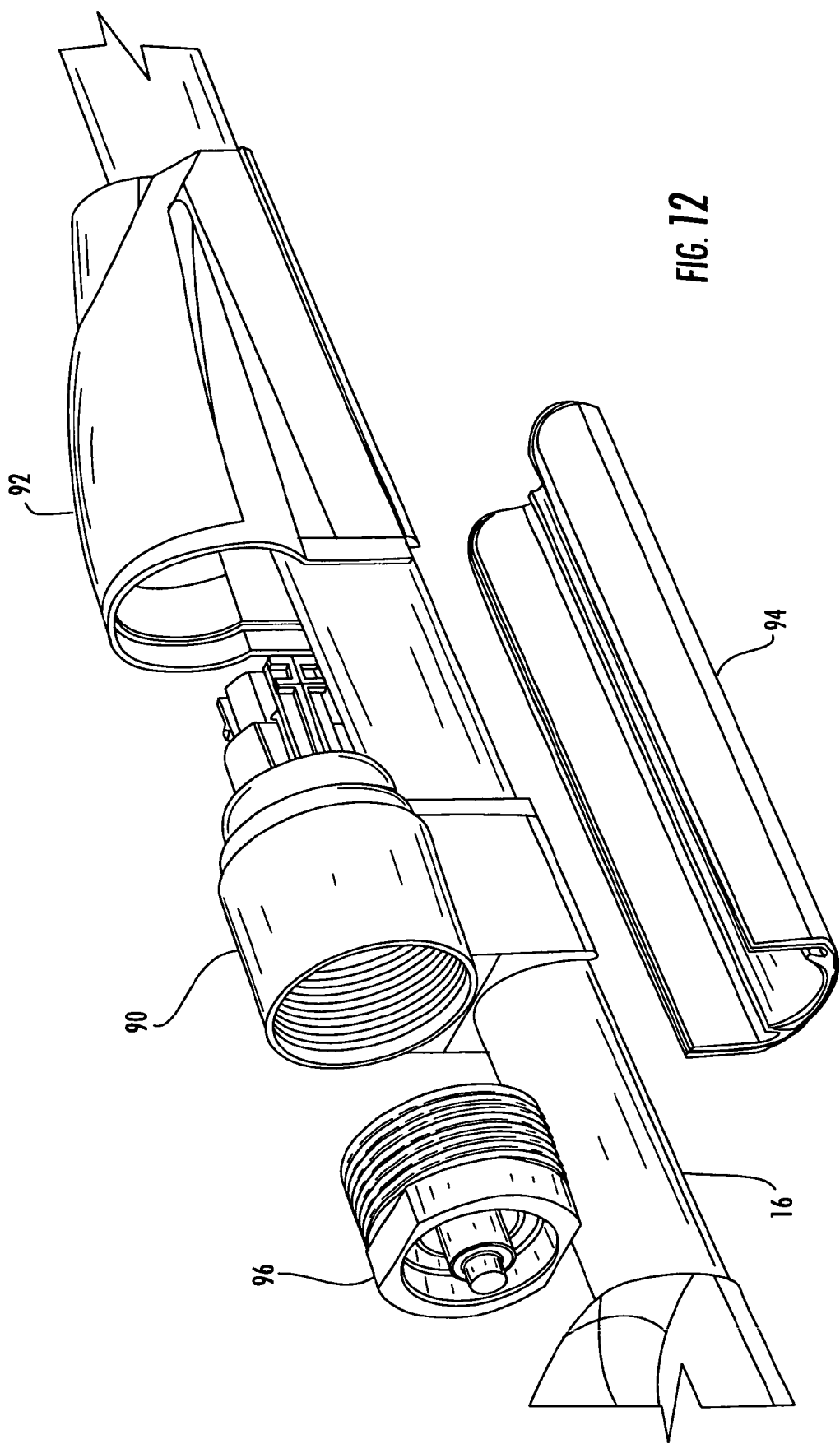
FIG. 12 is an exploded perspective view of another embodiment of a semi-hardened network access point illustrating hardened structure.
Figure 13:
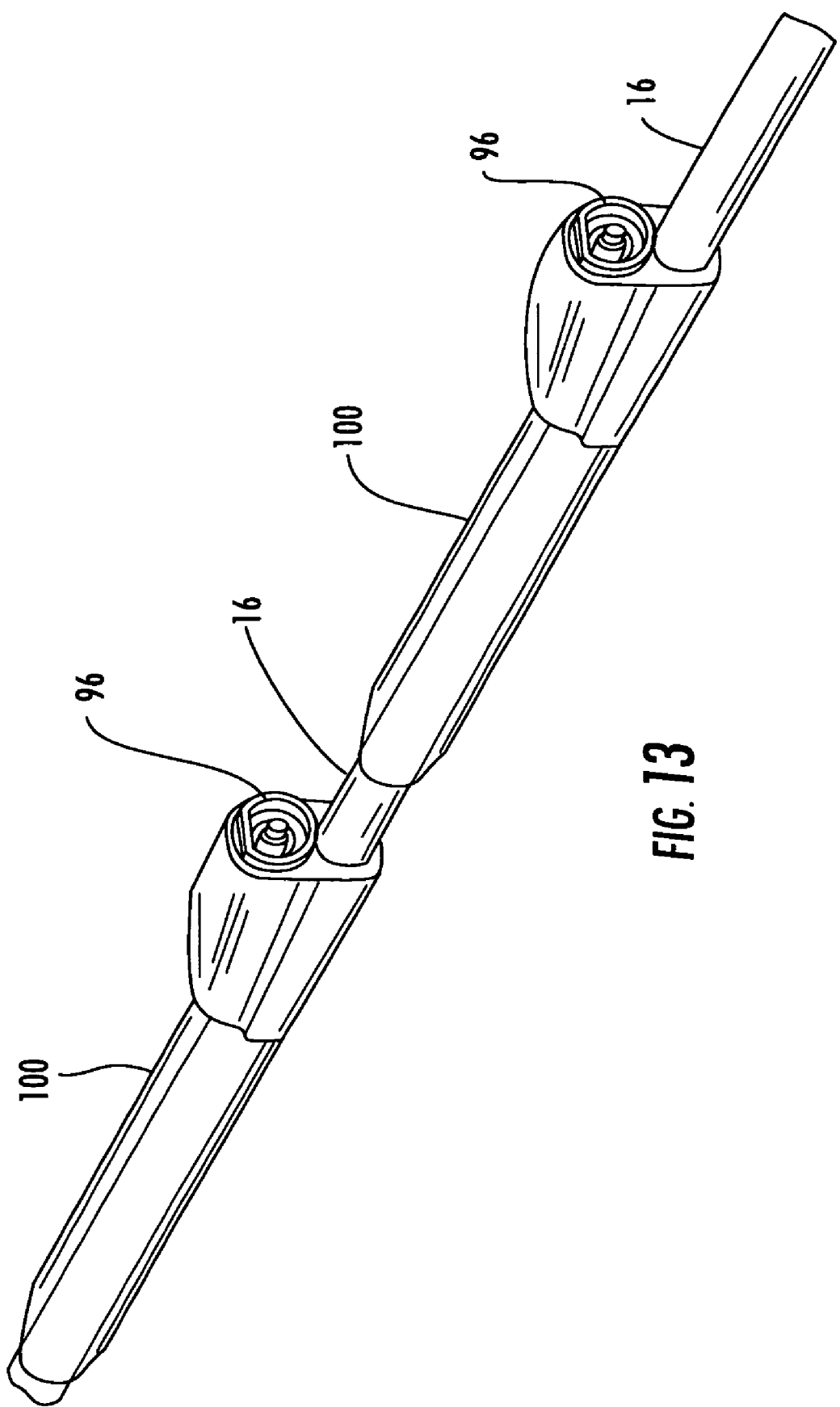
FIG. 13 is a perspective view of multiple network access points of FIG. 12 shown within an overmolded body.

Referring to FIG. 12, another embodiment of a semi-hardened access point is shown. Overmolding of integral tap solutions achieves good bond strength and robust sealing in flexible assemblies. When duct sizes get small, however, one issue that may result is that adequate wall thickness may not be available to achieve good urethane mechanical robustness. The access point in FIG. 12 includes a short robust housing comprised of molded or die cast components 90, 92, 94 and 96 among others, assembled around the distribution cable 16. The components are assembled to form a shell that houses an adapter and is in turn joined to the cable by an overmolded section 100 as shown in FIG. 13. Fibers leading to the back of the adapter may be protected via tubing another element sealed to the cable. A protective snout may be used in installations in which the device is pulled in the opposite direction. The shell may include one or more components in alternative embodiments.

Although the present invention has been illustrated and described herein with reference to specific embodiments and examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A cable assembly having a semi-hardened network access point, comprising:
   a distribution cable;
   a closure having at least one flexible interior portion and at least one rigid exterior portion, wherein the closure is disposed about the distribution cable prior to the installation of the cable assembly in the field; and
   a connector maintained at least partially within the closure prior to the installation of the cable assembly in the field, wherein the connector is optically coupled to the distribution cable.

2. The cable assembly of claim 1, wherein the connector is maintained entirely within the closure prior to the installation of the cable assembly in the field.

3. The cable assembly of claim 1, wherein a portion of the connector is selectively exposed to the outside environment subsequent to the installation of the cable assembly in the field.

4. The cable assembly of claim 3, further comprising a rigid receptacle coupled to the exposed portion of the connector subsequent to the installation of the cable assembly in the field.

5. The cable assembly of claim 1, further comprising a rigid receptacle coupled to an exposed portion of the connector subsequent to the installation of the cable assembly in the field.

6. The cable assembly of claim 1, further comprising an anti-rotation mechanism associated with the distribution cable and the closure, the anti-rotation mechanism preventing relative rotation between the distribution cable and the closure.

7. The cable assembly of claim 1, wherein the cable assembly is sized such that it fits through a 1.25-inch conduit.

8. The cable assembly of claim 1, further comprising a rigid connector assembly holder and a rigid connector assembly cover disposed within the closure having at least one flexible portion, wherein the connector is maintained entirely within the connector assembly holder and the connector assembly cover prior to the installation of the cable assembly in the field.

9. The cable assembly of claim 8, further comprising one or more ripcords coupled to at least the connector assembly cover, the one or more ripcords configured to be selectively pulled to remove the connector assembly cover from the connector assembly holder, thereby selectively exposing a portion of the connector to the outside environment subsequent to the installation of the cable assembly in the field.

10. A method for manufacturing and using a cable assembly having a semi-hardened network access point, comprising:
    providing a distribution cable;
    providing a closure having at least one flexible interior portion and at least one rigid exterior portion, wherein the closure is disposed about the distribution cable prior to the installation of the cable assembly in the field; and
    providing a connector maintained at least partially within the closure prior to the installation of the cable assembly in the field, wherein the connector is optically coupled to the distribution cable.

11. The method of claim 10, wherein the connector is maintained entirely within the closure prior to the installation of the cable assembly in the field.

12. The method of claim 11, wherein a portion of the connector is selectively exposed to the outside environment subsequent to the installation of the cable assembly in the field.

13. The method of claim 12, further comprising coupling a rigid receptacle to the exposed portion of the connector subsequent to the installation of the cable assembly in the field.

14. The method of claim 10, further comprising coupling a rigid receptacle to an exposed portion of the connector subsequent to the installation of the cable assembly in the field.

15. The method of claim 10, further comprising providing an anti-rotation mechanism associated with the distribution cable and the closure, the anti-rotation mechanism preventing relative rotation between the distribution cable and the closure.

16. The method of claim 10, wherein the cable assembly is sized such that it fits through a 1.25-inch conduit.

17. The method of claim 10, further comprising providing a rigid connector assembly holder and a rigid connector assembly cover disposed within the closure having at least one flexible portion, wherein the connector is maintained entirely within the connector assembly holder and the connector assembly cover prior to the installation of the cable assembly in the field.

18. The method of claim 17, further comprising providing one or more ripcords coupled to at least the connector assembly cover, including configuring the one or more ripcords to be selectively pulled to remove the connector assembly cover from the connector assembly holder, thereby selectively exposing a portion of the connector to the outside environment subsequent to the installation of the cable assembly in the field.

19. A cable assembly having a semi-hardened network access point, comprising:
    a distribution cable;
    a connector optically coupled to the distribution cable;
    an inner closure disposed about the distribution cable and the connector so that a portion of the connector remains external to the inner closure, wherein the inner closure is flexible; and
    an outer closure that covers the inner closure and the connector, the outer closure configured to be removable to expose the external connector portion to the environment subsequent to installation of the cable assembly in the field.

20. The cable assembly of claim 19, further including a rigid receptacle coupled to the external connector portion.

21. The cable assembly of claim 19, wherein the outer ever closure is rigid.

* * * * *